(12) United States Patent
Blaimschein et al.

(10) Patent No.: US 10,372,472 B2
(45) Date of Patent: *Aug. 6, 2019

(54) SYSTEM, METHOD, AND COMPUTER PROGRAM PRODUCT FOR CONDITIONALLY PREVENTING USE OF HARDWARE VIRTUALIZATION

(71) Applicant: McAfee, LLC, Santa Clara, CA (US)

(72) Inventors: Peter Blaimschein, Seitenstetten (AT); Thomas C. H. Steeiner, Linz (AT); Gregory William Dalcher, Tigard, OR (US); John Douglas Teddy, Portland, OR (US)

(73) Assignee: McAfee, LLC, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/820,296

(22) Filed: Aug. 6, 2015

(65) Prior Publication Data

US 2015/0347752 A1 Dec. 3, 2015

Related U.S. Application Data

(63) Continuation of application No. 11/867,987, filed on Oct. 5, 2007, now Pat. No. 9,128,741.

(51) Int. Cl.
| | | |
|---|---|---|
| *G06F 9/30* | (2018.01) | |
| *G06F 9/455* | (2018.01) | |
| *G06F 21/56* | (2013.01) | |
| *G06F 21/57* | (2013.01) | |
| *G06F 21/74* | (2013.01) | |

(52) U.S. Cl.
CPC .......... *G06F 9/45558* (2013.01); *G06F 21/56* (2013.01); *G06F 21/57* (2013.01); *G06F 21/74* (2013.01); *G06F 2009/45587* (2013.01); *G06F 2221/034* (2013.01)

(58) Field of Classification Search
None
See application file for complete search history.

(56) References Cited

U.S. PATENT DOCUMENTS

| | | | |
|---|---|---|---|
| 6,253,224 B1 | 6/2001 | Brice et al. | |
| 7,689,817 B2 * | 3/2010 | Zimmer | G06F 21/52 713/1 |
| 7,865,893 B1 * | 1/2011 | Omelyanchuk | G06F 11/3644 710/1 |
| 2004/0268361 A1 | 12/2004 | Schafer | |
| 2005/0198303 A1 | 9/2005 | Knauerhase et al. | |
| 2007/0180493 A1 | 8/2007 | Croft et al. | |

OTHER PUBLICATIONS

Naraine, "Blue Pill Prototype Creates 100% Undecteable Malware," eWeek Enterprise News & Reviews, Jun. 28, 2006.

(Continued)

*Primary Examiner* — Corey S Faherty
(74) *Attorney, Agent, or Firm* — Hanley, Flight & Zimmerman, LLC

(57) ABSTRACT

A system, method, and computer program product are provided for conditionally preventing use of hardware virtualization. In use, an attempt to use hardware virtualization is identified. Further, the use of the hardware virtualization is conditionally prevented.

20 Claims, 6 Drawing Sheets

(56) References Cited

OTHER PUBLICATIONS

United States Patent and Trademark Office, "Final Office Action," issued in connection with U.S. Appl. No. 11/867,987, dated Oct. 31, 2011, 9 pages.

United States Patent and Trademark Office, "Non-Final Office Action," issued in connection with U.S. Appl. No. 11/867,987, dated Jul. 18, 2011, 7 pages.

United States Patent and Trademark Office, "Notice of Allowance and Fee(s) Due," issued in connection with U.S. Appl. No. 11/867,987, dated Jan. 17, 2014, 7 pages.

United States Patent and Trademark Office, "Notice of Allowance and Fee(s) Due," issued in connection with U.S. Appl. No. 11/867,987, dated May 13, 2015, 7 pages.

\* cited by examiner

US 10,372,472 B2

SYSTEM, METHOD, AND COMPUTER PROGRAM PRODUCT FOR CONDITIONALLY PREVENTING USE OF HARDWARE VIRTUALIZATION

TECHNICAL FIELD

The present invention relates to virtualization, and more particularly to hardware virtualization.

BACKGROUND ART

Traditionally, security systems (e.g. antivirus, antispyware, etc.) attempt to identify, eliminate, prevent, etc. infection by malware. For example, the security systems may identify malware executing on an operating system utilizing signature scanning, heuristics, behavior patterns, etc. However, such security systems have customarily exhibited various limitations, such as, for example, in situations where hardware virtualization is utilized.

For example, malware utilizing hardware virtualization has generally been incapable of being identified using current security systems. Such malware may move a currently executing operating system into a virtual machine, such that the malware may not be detectable by a security system. Thus, moving the operating system into the virtual machine may result in the security system executing inside the virtual machine, such that the security system is therefore unable to identify the presence of the malware.

There is thus a need for addressing these and/or other issues associated with the prior art.

SUMMARY OF INVENTION

A system, method, and computer program product are provided for conditionally preventing use of hardware virtualization. In use, an attempt to use hardware virtualization is identified. Further, the use of the hardware virtualization is conditionally prevented.

DESCRIPTION OF EMBODIMENTS

Figure 1:
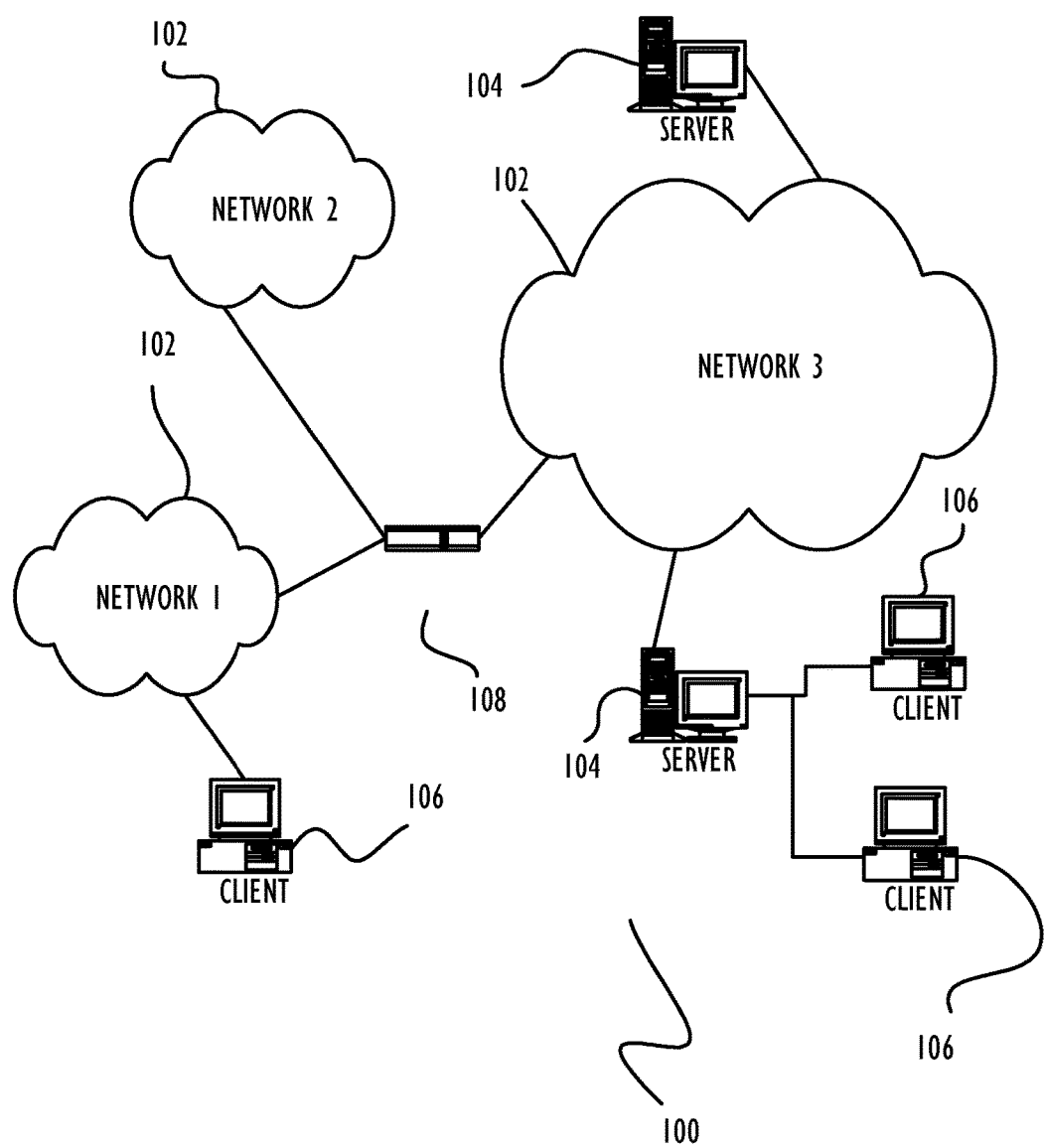
FIG. 1 illustrates a network architecture, in accordance with one embodiment.

FIG. 1 illustrates a network architecture 100, in accordance with one embodiment. As shown, a plurality of networks 102 is provided. In the context of the present network architecture 100, the networks 102 may each take any form including, but not limited to a local area network (LAN), a wireless network, a wide area network (WAN) such as the Internet, peer-to-peer network, etc.

Coupled to the networks 102 are servers 104 that are capable of communicating over the networks 102. Also coupled to the networks 102 and the servers 104 is a plurality of clients 106. Such servers 104 and/or clients 106 may each include a desktop computer, laptop computer, hand-held computer, mobile phone, personal digital assistant (PDA), peripheral (e.g. printer, etc.), any component of a computer, and/or any other type of logic. In order to facilitate communication among the networks 102, at least one gateway 108 is optionally coupled therebetween.

Figure 2:
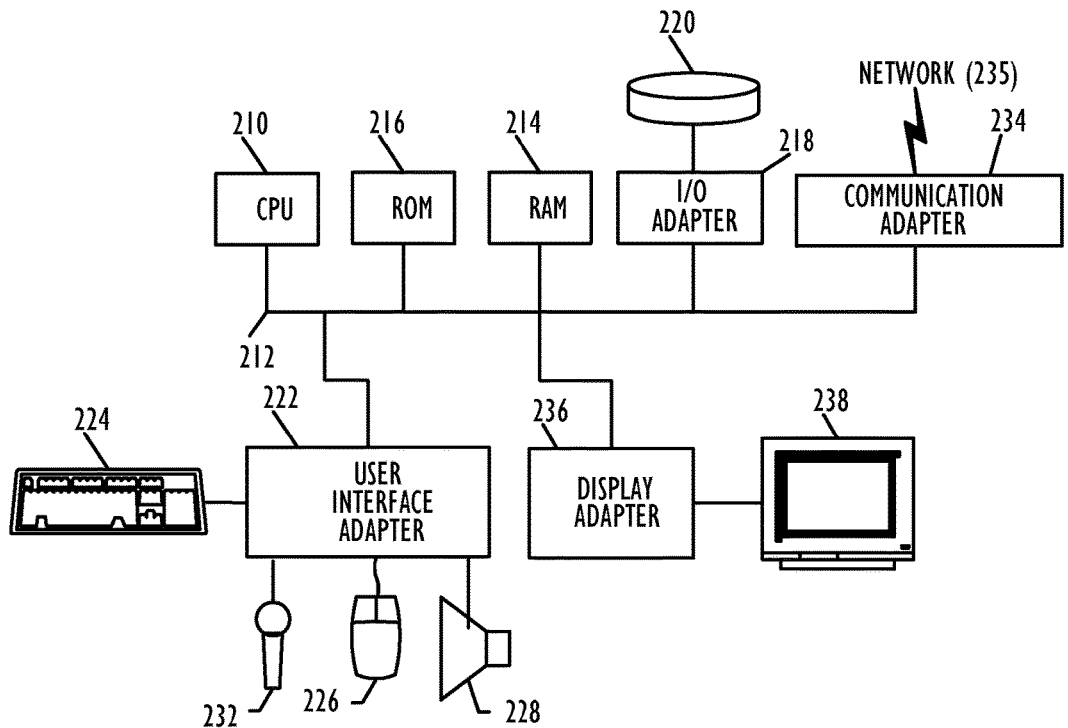
FIG. 2 shows a representative hardware environment that may be associated with the servers and/or clients of FIG. 1, in accordance with one embodiment.

FIG. 2 shows a representative hardware environment that may be associated with the servers 104 and/or clients 106 of FIG. 1, in accordance with one embodiment. Such figure illustrates a typical hardware configuration of a workstation in accordance with one embodiment having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen (not shown) to the bus 212, communication adapter 234 for connecting the workstation to a communication network 235 (e.g., a data processing network) and a display adapter 236 for connecting the bus 212 to a display device 238.

The workstation may have resident thereon any desired operating system. It will be appreciated that an embodiment may also be implemented on platforms and operating systems other than those mentioned. One embodiment may be written using C, and/or C++ language, or other programming languages.

Of course, the various embodiments set forth herein may be implemented utilizing hardware, software, or any desired combination thereof. For that matter, any type of logic may be utilized which is capable of implementing the various functionality set forth herein.

Figure 3:
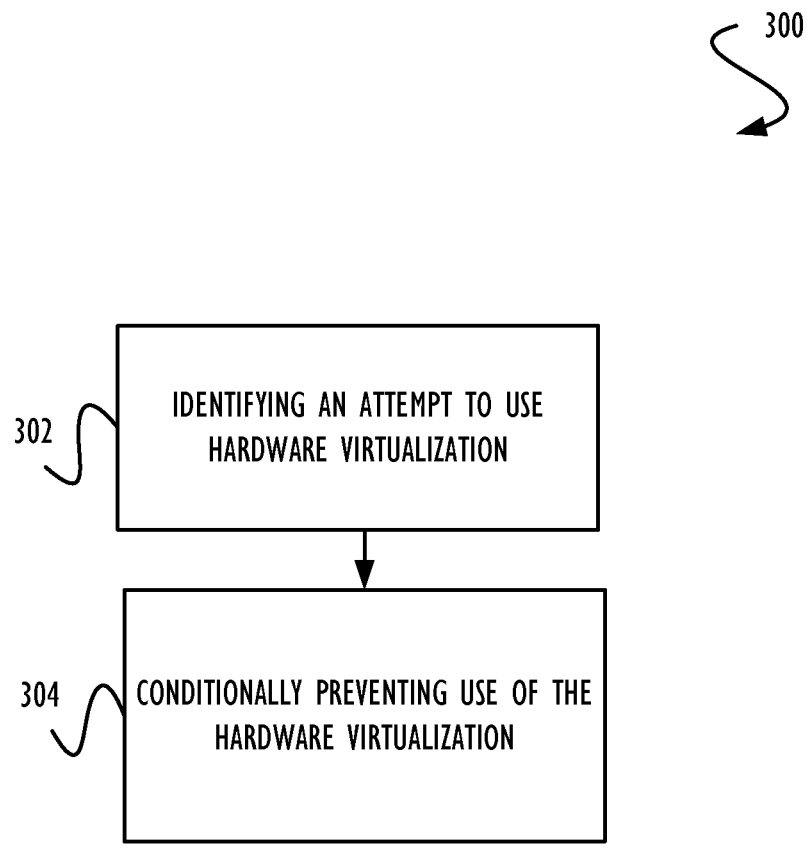
FIG. 3 shows a method for conditionally preventing use of hardware virtualization, in accordance with another embodiment.

FIG. 3 shows a method 300 for conditionally preventing use of hardware virtualization, in accordance with another embodiment. As an option, the method 300 may be carried out in the context of the architecture and environment of FIGS. 1 and/or 2. Of course, however, the method 300 may be carried out in any desired environment.

As shown in operation 302, an attempt to use hardware virtualization is identified. In the context of the present description, the attempt may include any action, request, call, etc. to use the hardware virtualization. As an option, the attempt may be initiated by an application. For example, the application may be a driver, an operating system, a malware application, a spyware application, a virtualization application, etc. In various embodiments, the attempt to use the hardware virtualization may include an attempt to enable the hardware virtualization, execute the hardware virtualization, etc.

Further, the hardware virtualization may allow for any virtualization of hardware. As an option, the virtualization of the hardware may also include virtual hardware (e.g. memory, hard drives, network cards, etc.). Just by way of example, the use of the hardware virtualization may include an abstraction of the hardware by a hardware virtualization layer into a virtual machine. Optionally, the hardware may be associated with a hardware virtualization provider.

In one embodiment, the hardware virtualization layer may execute directly on the hardware virtualization provider. For example, the hardware virtualization provider may be a central processing unit (e.g. such as the central processing unit 210 of FIG. 2). In another embodiment, the hardware virtualization layer may execute within an operating system.

Furthermore, the hardware virtualization layer may include a virtual machine guard that is coupled to the virtual machine and the hardware virtualization provider. In the context of the present embodiment, the virtual machine guard may include any module capable of monitoring use of the hardware virtualization. In another embodiment, the virtual machine guard may include a virtual machine monitor (e.g. a hypervisor). As an option, the virtual machine guard (e.g. the virtual machine monitor) may coordinate and/or allocate resources associated with the virtual machine. Accordingly, the virtual machine guard may be utilized for monitoring attempts to use the hardware virtualization, and thus may be utilized for identifying the attempt to use the hardware virtualization.

In one embodiment, the virtual machine guard may include the hardware virtualization layer. For example, by using the hardware virtualization of the hardware virtualization provider, the virtual machine guard may prevent other applications from using hardware virtualization. Further, in another embodiment, the virtual machine guard may run within the operating system.

In yet another embodiment, the virtual machine guard may register as the hardware virtualization layer with the hardware virtualization provider. For the example, the registering may allow the virtual machine guard to receive a request to use the hardware virtualization. Further, upon registering the virtual machine guard, the virtual machine may be created by the virtual machine guard. As an option, the operating system may execute within the virtual machine of the virtual machine guard.

In another embodiment, the virtual machine guard may register with the hardware virtualization provider prior to loading the operating system. For example, the hardware virtualization may be registered as part of a basic input/output system (BIOS), an operating system loader, a master boot record, and/or any other application used for loading the operating system. In yet another embodiment, once the virtual machine guard is registered and the virtual machine is created, the operating system may be loaded into the virtual machine. Loading the operating system into the virtual machine may allow the virtual machine guard to identify the attempt to access the hardware virtualization.

Further, in still yet another embodiment, the virtual machine guard may register with the virtualization provider while the operating system is running, and thus after the operating system has loaded. Optionally, the virtual machine guard may be executed as an application, an application driver, an operating system driver, etc. in order to register with the hardware virtualization provider. Further, after registering with the hardware virtualization provider and/or creating the virtual machine, the virtual machine guard may move the running operating system into the virtual machine. For example, in order to move the running operating system inside the virtual machine, the virtual machine guard may clone resources (e.g. registers, memory tables, page tables, etc.) associated with the operating system for use as the resources associated with the virtual machine. As an option, moving the running operating system into the virtual machine may allow the virtual machine guard to identify the attempt to access the hardware virtualization.

In addition, in one embodiment, the identification of the attempt to use the hardware virtualization may be carried out using the virtual machine guard. Further, after registering with the hardware virtualization provider, the virtual machine guard may receive callbacks for any attempt by an application to use the hardware virtualization. For example, if the application attempts to use the hardware virtualization of the hardware virtualization provider, the virtual machine guard may receive a callback identifying the attempt. As an option, the callback may include instructions, data, a plurality of pointers, and/or a function associated with the attempt to use the hardware virtualization provider.

Additionally, as shown in operation 304, use of the hardware virtualization is conditionally prevented. In one embodiment, use of the hardware virtualization may be conditionally prevented based on a source of the attempt to use the hardware virtualization. For example, the source may include an identifier associated with an application that initiated the attempt to use the hardware virtualization.

Thus, the identifier associated with the application that initiated the attempt to use the hardware virtualization may be identified (e.g. by the virtual machine guard). Optionally, the virtual machine guard may determine if the identifier associated with the application matches a predetermined allowed identifier. For example, the predetermined allowed identifier may be included a list (e.g. file, database, etc.) of predetermined allowed identifiers (e.g. predetermined to not be associated with malware, etc.). Optionally, the list of predetermined allowed identifiers may include a list of applications predetermined to be allowed to use the hardware virtualization. For example, the predetermined allowed identifier may be selected from a white list of applications predetermined to be allowed to use the hardware virtualization.

In one embodiment, the attempt to use the hardware virtualization may be allowed, if the identifier associated with the application matches the predetermined allowed identifier. In this way, the hardware virtualization may be utilized in response to the identified attempt for such use. Additionally, the attempt to use the hardware virtualization may be prevented, if the identifier associated with the application does not match the predetermined allowed identifier. It should be noted that the attempt may be prevented in any desired manner, such as, for example, blocking use of the hardware virtualization, etc. As a further option (not shown), the attempt to use the hardware virtualization may be logged.

In another embodiment, usage of the hardware virtualization may not be all or nothing. As an option, computer code attempting to use the hardware virtualization may choose a degree to which the computer code uses the hardware virtualization. For example, a hardware virtualization rootkit (e.g. "Blue Pill") may perform the hardware virtualization of select operations. Optionally, the hardware virtualization of the select operations may be referred to as "virtualization hijacking" In yet another embodiment, the degree may indicate the amount, quantity, level, scale, extent, etc. to which the computer code fully virtualizes the hardware. Still yet, in another embodiment, the select operations may include instructions, commands, directives, actions, data, etc. associated with the hardware. In the context of the present embodiment, the virtual machine guard may protect against use of the hardware virtualization rootkit.

More illustrative information will now be set forth regarding various optional architectures and features with which the foregoing technique may or may not be implemented, per the desires of the user. It should be strongly noted that the following information is set forth for illustrative purposes and should not be construed as limiting in any manner. Any of the following features may be optionally incorporated with or without the exclusion of other features described.

Figure 4:
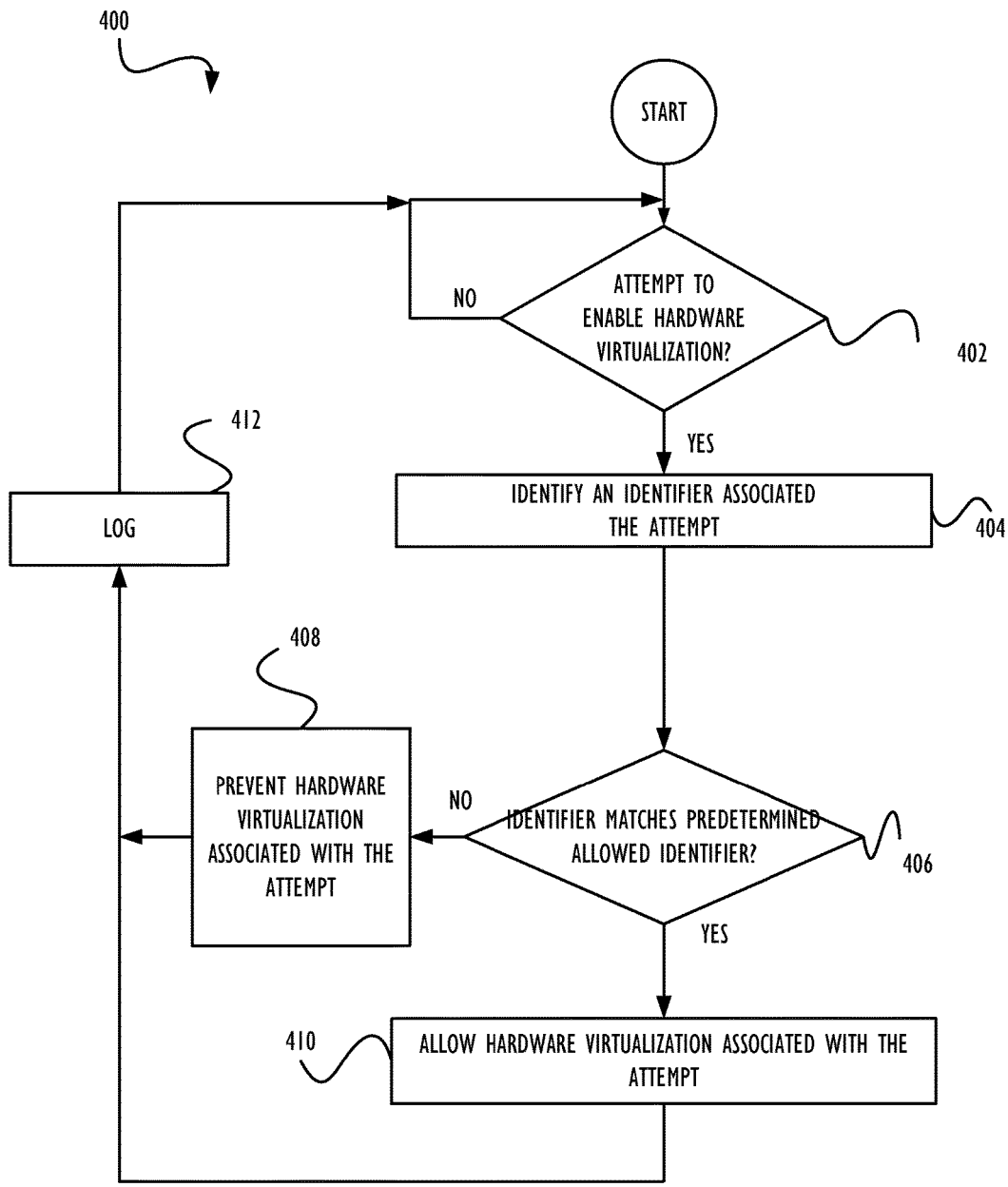
FIG. 4 shows a method for conditionally preventing use of hardware virtualization associated with an attempt to enable the hardware virtualization, in accordance with yet another embodiment.

FIG. 4 shows a method 400 for conditionally preventing use of hardware virtualization associated with an attempt to enable the hardware virtualization, in accordance with yet another embodiment. As an option, the method 400 may be carried out in the context of the architecture and environment of FIGS. 1-3. Of course, however, the method 400 may be carried out in any desired environment. It should also be noted that the aforementioned definitions may apply during the present description.

As shown in decision 402, it is determined whether an attempt to enable hardware virtualization has been identified. In one embodiment, a virtual machine guard may monitor instructions from an operating system, a driver, an application, etc. to a hardware virtualization provider. For example, the virtual machine guard may passively monitor instructions from the operating system to the hardware virtualization provider for identifying instructions associated with an attempt to enable the hardware virtualization. As an option, the instructions may include assembly instructions. Accordingly, the virtual machine guard may wait for the assembly instructions that instruct the hardware virtualization provider to enable the hardware virtualization.

As shown in operation 404, once an attempt to enable the hardware virtualization is identified, an identifier associated with the attempt is identified. In one embodiment, the identifier may be a name, a hash, a signature, a key, a certificate, etc. Further, the identifier may identify a component, an application, a file, a directory, a location, an application program interface (API), a callback, an instruction, and/or any other identifier capable of being associated with the attempt to enable the hardware virtualization. For example, the identifier may be associated with an application that initiated the attempt to enable the hardware virtualization. As an option, the identifier may be identified utilizing the virtual machine guard.

Further, it is determined if the identifier associated with the application matches a predetermined allowed identifier, as shown in decision 406. In one embodiment, the predetermined allowed identifier may include a list of identifiers associated with applications predetermined to be allowed to use the hardware virtualization. As an option, the list of predetermined allowed identifiers may be user defined, provided by a central management system, provided by a vendor of the virtual machine guard, etc. For example, the list of predetermined allowed identifiers provided by the vendor of the virtual machine guard may include identifiers associated with virtualization applications such as WMware Server™ provided by VMware®, VirtualPC™ provided by Microsoft®, etc.

As shown in operation 408, the attempt to enable the hardware virtualization is prevented, if it is determined that the identifier associated with the attempt does not match the list of predetermined allowed identifiers. Thus, the virtual machine guard may optionally prevent the attempt, if the identifier is not located in the list of predetermined allowed identifiers. Furthermore, as shown in operation 410, the attempt to enable the hardware virtualization is allowed, if it is determined that the identifier associated with the attempt matches the predetermined allowed identifier. For example, the virtual machine guard may allow the attempt, if the identifier is located in the list of predetermined allowed identifiers.

In addition, as shown in operation 412, the attempt to enable the hardware virtualization is logged. While it is shown that the attempt is logged in response to either of a determination that the identifier does match a predetermined allowed identifier or that the identifier does not match a predetermined allowed identifier, it should be noted that the attempt may optionally only be logged in response to a determination that the identifier does not match a predetermined allowed identifier. In various embodiments, a date and time of the attempt, the identifier associated with the attempt, the result from the determination in operation 406, and/or any other information capable of being associated with the attempt may be logged. As an option, the information logged may be stored in memory, written to a file, transmitted to another device, etc.

As another option, the logged attempt may be displayed to the user. For example, the logged attempt may be displayed as a warning, an alert, a report, etc. via a graphical user interface. In another embodiment, the logged attempt may be displayed to the user via a textual interface or command line interface. In addition, as yet another option, the logged attempt may be reported to a central management system.

In yet still another embodiment, after the attempt to use the hardware virtualization is logged, the virtual machine guard may return to operation 402 in order to identify an additional attempt to use the hardware virtualization. Of course, however, monitoring of additional attempts to enable the hardware virtualization may continue during any of operations 404-412.

Furthermore, in one optional embodiment (not shown), the list of allowed identifiers may be updated in response to the logged attempt being displayed to the user. For example, the user may be presented with an option to add the identifier associated with a prevented attempt to the list of predetermined allowed identifiers. As an option, if the user indicates that the identifier is allowed, the allowed identifier may be added to the list of predetermined allowed identifiers so future attempts to use the hardware virtualization associated with such identifier may be allowed.

Figure 5:
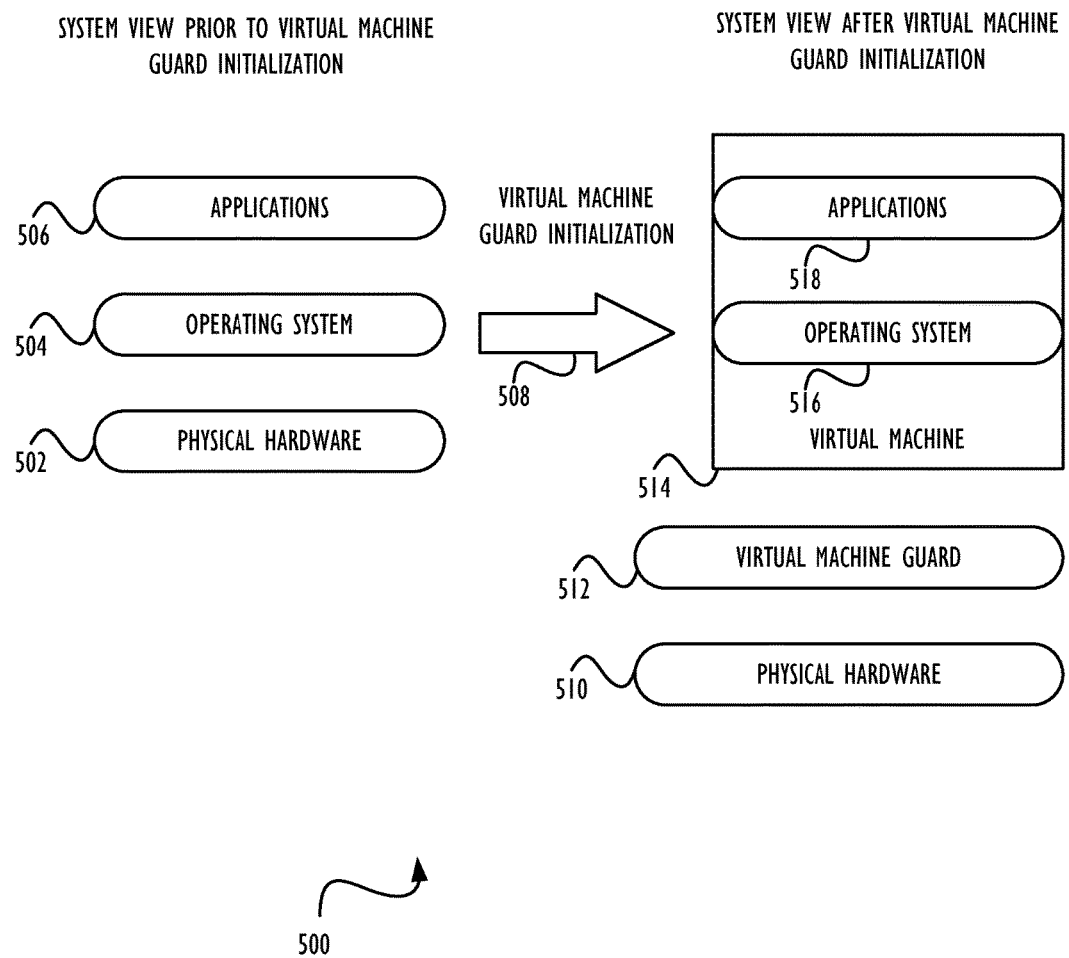
FIG. 5 shows a system for deploying a virtual machine guard after an operating system is loaded, in accordance with still yet another embodiment.

FIG. 5 shows a system 500 for deploying a virtual machine guard after loading an operating system, in accordance with still yet another embodiment. As an option, the system 500 may be implemented in the context of the architecture and environment of FIGS. 1-4. Of course, however, the system 500 may be carried out in any desired environment. It should also be noted that the aforementioned definitions may apply during the present description.

As shown, the system 500, prior to initialization of the virtual machine guard 508, may include physical hardware 502, an operating system 504, and applications 506. In one embodiment, the applications 506 may be executing on top of the operating system 504, which may further be executing on top of the physical hardware 502. In another embodiment, the operating system 504 may be loaded and/or running prior to the initialization of the virtual machine guard 508.

In one embodiment, the virtual machine guard may be initialized 508 by a user executing an application, executing a driver, etc. In yet another embodiment, the virtual machine guard may be automatically initialized 508 by the operating system 504, one of the applications 506 (e.g. such as a driver), etc. In still yet another embodiment, the virtual machine guard may be automatically initialized 508 via a scheduled event and/or action, in response to an event, at the request of another application and/or driver, etc.

Further, in still yet another embodiment, once the virtual machine guard is initialized 508, the virtual machine guard 512 may move the previously loaded operating system 504 into a virtual machine 514, such that the previously loaded operating system 504 may become an operating system 516 running within the virtual machine 514. Optionally, the virtual machine guard 512 may move the previously loaded operating system 504 into the virtual machine 514 by cloning the registers, memory tables, page tables, etc. associated with the previously loaded operating system 504. As a result, the applications 518 may also be moved to execute on top of the operating system 516 within the virtual machine 514, and may thus also be moved inside the virtual machine 514.

In one embodiment, once the virtual machine guard 512 is executing on top of the physical hardware 510, the operating system 516 may execute in the virtual machine 514. For example, the virtual machine guard 512 may operate outside the virtual machine 514 as a hypervisor executing directly on top of the physical hardware 510. Further, in yet another embodiment, the virtual machine guard 512 may monitor the instructions from the operating system 516 to the physical hardware 510.

As an option, the virtual machine guard 512 may identify an attempt to use hardware virtualization of the physical hardware 510. In addition, as another option, the virtual machine guard 512 may prevent or allow the use of the hardware virtualization based on a determination of whether an identifier (e.g. associated with the application 518 and/or the operating system 516) associated with the attempt is predetermined to be allowed to use the hardware virtualization of the physical hardware 510. For example, the application 518 running on top of the operating system 516, which is executing within virtual machine 514, may attempt to use the hardware virtualization of the physical hardware 510. In the context of the present example, the virtual machine guard 512 may identify the identifier associated with the application 518 that attempted to use the hardware virtualization of the physical hardware 510, and may prevent or allow the attempt based on a determination of whether the identifier matches a predetermined allowed identifier.

Figure 6:
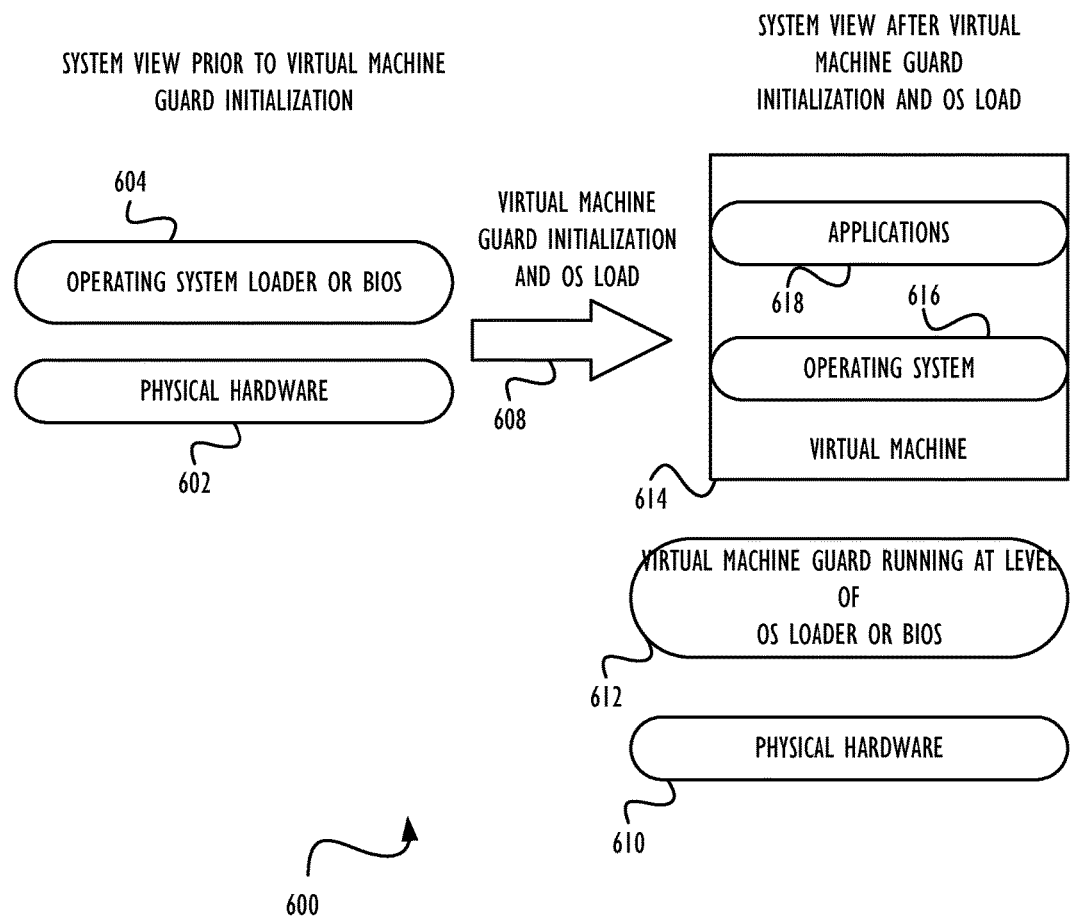
FIG. 6 shows a system for deploying a virtual machine guard before an operating system is loaded, in accordance with another embodiment.

FIG. 6 shows a system 600 for deploying a virtual machine guard prior to loading an operating system, in accordance with one embodiment. As an option, the system 600 may be implemented in the context of the architecture and environment of FIGS. 1-5. Of course, however, the system 600 may be implemented in any desired environment. Again, it should be noted that the aforementioned definitions may apply during the present description.

As shown, the system 600, prior to initialization of the virtual machine guard 608, may include physical hardware 602, and an operating system loader or BIOS 604. In one embodiment, the virtual machine guard 608 may be initialized prior to loading the operating system 616 via the operating system loader or BIOS 604.

In another embodiment, the virtual machine guard may be initialized 608 as part of the operating system loader or BIOS 604. For example, the operating system loader or BIOS 604 may initialize the virtual machine guard 608 prior to loading the operating system 616. In yet another embodiment, the virtual machine guard 612 may be stored within the operating system loader or BIOS 604, memory (e.g. RAM 214, ROM 216, disk storage units 220 of FIG. 2, etc.), etc. In still yet another embodiment, the virtual machine guard 612 may execute within the operating system loader or BIOS 604, allocated memory, etc. For example, the virtual machine guard 612 may be initialized as part of the operating system loader or BIOS 604, as part of a master boot record, or any other application used for boot strapping and/or loading the operating system 616.

In one embodiment, once the virtual machine guard is initialized 608, hardware virtualization may be enabled and/or a virtual machine 614 may be created. Further, in another embodiment, once the virtual machine 614 is created, the operating system loader or BIOS 604 or the virtual machine guard 612 may load the operating system 616 into the virtual machine 614. In addition, applications 618 may execute on top of operating system 616, which is executing inside the virtual machine 614.

In one embodiment, once the operating system 616 is executing in the virtual machine 614, the virtual machine guard 612 may execute on top of physical hardware 610. For example, the virtual machine guard 612 may operate outside the virtual machine 614 as a hypervisor executing directly on top of the physical hardware 610.

Further, in another embodiment, the virtual machine guard 612 may monitor instructions from the operating system 616 to the physical hardware 610. Further, as an option, the virtual machine guard 612 may identify an attempt to use hardware virtualization of the physical hardware 610. In addition, as another option, the virtual machine guard 612 may prevent or allow the use of the hardware virtualization based on a determination of whether an identifier associated with the attempt to use the hardware virtualization for the physical hardware 610 is allowed. For example, an application 618 running on top of the operating system 616, which is executing within virtual machine 614, may attempt to use the hardware virtualization of the physical hardware 610. In the context of the present example, the virtual machine guard 612 may identify the identifier associated with the application 618 that attempted to use the hardware virtualization of the physical hardware 610, and may prevent or allow the attempt based on whether the identifier matches a predetermined allowed identifier.

In one exemplary embodiment, a virtual machine guard may be used with an operating system running inside a separate virtualization application. For example, the separate virtualization application may execute on a host operating system. Further, a guest operating system may be executing on the separate virtualization application. As an option, the host operating system may be the operating system first loaded, executing, and/or running on physical hardware, and the guest operating system may be the operating system loaded, executing, and/or running inside the separate virtualization application running on the host operating system.

Moreover, the virtual machine guard may be coupled with the separate virtualization application. Optionally, the virtual machine guard may coordinate with the separate virtualization application. In this way, the virtual machine guard may conditionally prevent hardware virtualization attempts associated with the separate virtualization application.

Still yet, as another option, the virtual machine guard may be integrated within the separate virtualization application. For example, the separate virtualization application may utilize application programming interfaces (APIs) of the virtual machine guard. As another example, the virtual machine guard may use APIs of the separate virtualization application. Additionally, as still yet another example, the virtual machine guard application may be dynamically or statically linked with the separate virtualization application.

Still yet, in another example, the virtual machine guard application may be registered with the separate virtualization application.

In one embodiment, the virtual machine guard may identify applications executing within the separate virtualization application that attempt to use the hardware virtualization. For example, by identifying the attempt to use the hardware virtualization from within the guest operating system running on the separate virtualization application, the virtual machine guard may further allow or prevent those applications from using the hardware virtualization.

In another embodiment, the virtual machine guard may allow the separate virtualization application to coexist with the virtual machine guard using the hardware virtualization via chain virtualization. Optionally, in the chain virtualization, multiple virtualization applications may use the hardware virtualization via chaining of the virtualization applications with the physical hardware. As an option, the chaining of the virtualization applications with the physical hardware may be implemented via software virtualization. As another option, the software virtualization may be a virtualization hosting mechanism that may allow an additional virtualization application to run as a virtualization guest along with the other virtualization applications. For example, a first virtualization application supporting chain virtualization may relay and process commands from a second virtualization application supporting chain virtualization via the software virtualization executing on the physical hardware.

In yet another embodiment, if the separate virtualization application does support the chain virtualization, the virtual machine guard may prevent or allow the attempt for hardware virtualization from the separate virtualization application. As an option, if the separate virtualization application supports chain virtualization, then the virtual machine guard may create a new virtual machine and/or move the currently executing separate virtualization application into the new virtual machine utilizing the chain virtualization. Additionally, the virtual machine guard may be initialized prior to running the separate virtualization application, or while the separate virtualization application is running. Optionally, the virtual machine guard may be executed from within the guest operating system executing within the separate virtualization application, or from within the host operating system executing directly on the physical hardware.

In still yet another embodiment, if the separate virtualization application does not support the chain virtualization, the virtual machine guard may prevent or allow the attempt for the hardware virtualization from the separate virtualization application. If the virtual machine guard allows the separate virtualization application, which does not support chain virtualization, to use hardware virtualization, then the virtual machine guard may not prevent subsequent hardware virtualization attempts since the separate virtualization application may be using the hardware virtualization.

Thus, in one embodiment, the virtual machine guard may support chain virtualization. As an option, the virtual machine guard may be implemented directly within the separate virtualization application. Further, as an additional option, the virtual machine guard may be implemented directly within the host operating system, the guest operating system, etc.

While various embodiments have been described above, it should be understood that they have been presented by way of example only, and not limitation. For example, any of the network elements may employ any of the desired functionality set forth hereinabove. Thus, the breadth and scope of a preferred embodiment should not be limited by any of the above-described exemplary embodiments, but should be defined only in accordance with the following claims and their equivalents.

We claim:

1. A non-transitory machine readable medium, on which are stored instructions that when executed cause a computer having hardware virtualization capability to:
   register a virtual machine guard of a virtualization layer with a hardware virtualization provider while an operating system is running;
   move the running operating system into a virtual machine by the virtual machine guard;
   recognize, by the virtual machine guard, an attempt to use hardware virtualization by the operating system or an application running under the operating system;
   determine an identifier associated with a source of the attempt;
   disallow the attempt as being associated with malware responsive to a determination that the identifier is on a list of predetermined identifiers;
   allow the attempt responsive to a determination that the identifier is not on the list of predetermined identifiers; and
   log the attempt to use hardware virtualization,
   wherein, subsequent to logging the attempt, the virtual machine guard continues operation to recognize additional attempts to use hardware virtualization.

2. The machine readable medium of claim 1, wherein the instructions further comprise instructions that when executed cause the computer to:
   present information identifying the source.

3. The machine readable medium of claim 2, wherein the instructions further comprise instructions that when executed cause the computer to:
   receive input responsive to the presented information.

4. The machine readable medium of claim 3, wherein the instructions further comprise instructions that when executed cause the computer to:
   add the identifier to the list responsive to the input.

5. The machine readable medium of claim 1, wherein the instructions further comprise instructions that when executed cause the computer to:
   create a virtual machine by the virtual machine guard; and
   execute an operating system within the virtual machine guard,
   wherein the instructions that when executed cause the computer to recognize by the virtual machine guard an attempt to use hardware virtualization comprise instructions that when executed cause the computer to:
   detect an attempt to use hardware virtualization by an application running under the operating system, and
   wherein the instructions that when executed cause the computer to determine an identifier associated with a source of the attempt comprise instructions that when executed cause the computer to:
   associate an identifier with the application.

6. The machine readable medium of claim 1, wherein the instructions that when executed cause the computer to recognize, by the virtual machine guard of the virtualization layer, an attempt to use hardware virtualization comprise instructions that when executed cause the computer to:
   monitor by the virtual machine guard communication with a virtualization provider.

7. The machine readable medium of claim 1, wherein the instructions further comprise instructions that when executed cause the computer to:

register the virtual machine guard with a virtualization provider.

8. A programmable device having a hardware virtualization capability, comprising:
one or more processors having a hardware virtualization capability; and
a memory, coupled to the one or more processors, on which are stored instructions that when executed cause some of the one or more processors to:
register a virtual machine guard of a virtualization layer with a hardware virtualization provider while an operating system is running;
move the running operating system into a virtual machine by the virtual machine guard;
recognize, by the virtual machine guard, an attempt to use hardware virtualization by the operating system or an application running under the operating system;
determine an identifier associated with a source of the attempt;
disallow the attempt as being associated with malware, responsive to the identifier being on a list of predetermined identifiers;
allow the attempt, responsive to the identifier not being on the list of predetermined identifiers; and
log the attempt to use hardware virtualization,
wherein, subsequent to logging the attempt, the virtual machine guard continues operation to recognize additional attempts to use hardware virtualization.

9. The programmable device of claim 8, wherein the instructions further comprise instructions that when executed cause some of the one or more processors to:
present information identifying the source.

10. The programmable device of claim 9, wherein the instructions further comprise instructions that when executed cause some of the one or more processors to:
receive input responsive to the presented information; and
add the identifier to the list responsive to the input.

11. The programmable device of claim 8, wherein the instructions further comprise instructions that when executed cause some of the one or more processors to:
create a virtual machine by the virtual machine guard; and
execute an operating system within the virtual machine guard,
wherein the instructions that when executed cause some of the one or more processors to recognize, by the virtual machine guard of the virtualization layer, an attempt to use hardware virtualization comprise instructions that when executed cause some of the one or more processors to:
detect an attempt to use hardware virtualization by an application running under the operating system, and
wherein the instructions that when executed cause some of the one or more processors to determine an identifier associated with a source of the attempt comprise instructions that when executed cause some of the one or more processors to:
associate an identifier with the application.

12. The programmable device of claim 8, wherein the instructions that when executed cause some of the one or more processors to recognize, by the virtual machine guard of the virtualization layer, an attempt to use hardware virtualization comprise instructions that when executed cause some of the one or more processors to:
monitor by the virtual machine guard communication with a virtualization provider.

13. The programmable device of claim 8, wherein the instructions further comprise instructions that when executed cause some of the one or more processors to:
register the virtual machine guard with a virtualization provider.

14. A method of preventing operation of malware comprising:
registering a virtual machine guard of a virtualization layer with a hardware virtualization provider while an operating system is running;
moving the running operating system into a virtual machine by the virtual machine guard;
recognizing, by the virtual machine guard, an attempt to use hardware virtualization by the operating system or an application running under the operating system;
determining an identifier associated with a source of the attempt;
disallowing the attempt as being associated with malware, responsive to determining the identifier is on a list of predetermined identifiers;
allowing the attempt responsive to determining the identifier is not on the list of predetermined identifiers; and
logging the attempt to use hardware virtualization,
wherein, subsequent to logging the attempt, the virtual machine guard continues operation to recognize additional attempts to use hardware virtualization.

15. The method of claim 14, further comprising:
presenting information identifying the source.

16. The method of claim 15, further comprising:
receiving input responsive to the presented information.

17. The method of claim 16, further comprising:
adding the identifier to the list responsive to the input.

18. The method of claim 14, further comprising:
creating a virtual machine by the virtual machine guard; and
executing an operating system within the virtual machine guard,
wherein recognizing, by the virtual machine guard of the virtualization layer, an attempt to use hardware virtualization comprises:
detecting an attempt to use hardware virtualization by an application running under the operating system, and
wherein determining an identifier associated with a source of the attempt comprises:
associating an identifier with the application.

19. The method of claim 14, wherein recognizing, by the virtual machine guard of the virtualization layer, an attempt to use hardware virtualization comprises:
monitor by the virtual machine guard communication with a virtualization provider.

20. The method of claim 14, further comprising:
registering the virtual machine guard with a virtualization provider.

* * * * *